(12) United States Patent
Busch-Sorensen (10) Patent No.: US 8,240,561 B2
(45) Date of Patent: Aug. 14, 2012

(54) CONTACTLESS SMARTCARD AUTHENTICATION

(75) Inventor: Thomas Busch-Sorensen, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 148 days.

(21) Appl. No.: 12/715,320

(22) Filed: Mar. 1, 2010

(65) Prior Publication Data

US 2010/0224682 A1    Sep. 9, 2010

Related U.S. Application Data

(60) Provisional application No. 61/157,176, filed on Mar. 3, 2009.

(51) Int. Cl.
  *G06K 19/05*    (2006.01)
(52) U.S. Cl. .................................... 235/380; 235/492
(58) Field of Classification Search .................. 235/380, 235/382, 487, 492
  See application file for complete search history.

(56) References Cited

U.S. PATENT DOCUMENTS

| 7,227,449 | B2 * | 6/2007 | Bonneau et al. | 340/10.41 |
| 7,701,344 | B2 * | 4/2010 | Mattice et al. | 340/572.1 |
| 7,706,838 | B2 * | 4/2010 | Atsmon et al. | 455/558 |

FOREIGN PATENT DOCUMENTS

WO    WO 2006/082540 A2    8/2006

OTHER PUBLICATIONS

PCT International Search Report and Written Opinion mailed Oct. 14, 2010, International Application No. PCT/US2010/025878, 15 pages.
Heydt-Benjamin, Thomas et al., "Vulnerabilities in First-Generation RFID-enabled Credit Cards", dated Oct. 22, 2006, 17 pages.
Jacobs, Bart et al., "Smart Cards in Public Transport: the Mifare Classic Case," dated Apr. 22, 2008, 11 pages.
Karygiannis, Tom et al., "Guidelines for Securing Radio Frequency Identification (RFID) Systems", National Institute of Standards and Technology, dated Apr. 2007, 154 pages.
Kirschenbaum, Ilan, et al., "How to Build a Low-Cost, Extended-Range RFID Skimmer", dated Feb. 2, 2006, 22 pages.
Mirowski, Luke et al., "Deckard: A System to Detect Change of RFID Tag Ownership", International Journal of Computer Science and Network Security, vol. 7, No. 7, dated Jul. 2007, 10 pages.
Siekerman, Pieter et al., "Security Evaluation of the disposable OV-chipkaart", V1.6, dated Jul. 26, 2007, 35 pages.

(Continued)

*Primary Examiner* — Daniel StCyr
(74) *Attorney, Agent, or Firm* — Kilpatrick Townsend & Stockton LLP (57) ABSTRACT

Techniques for authenticating a contactless smartcard in a card processing system are disclosed. A card reader measures an impulse response associated with the contactless smartcard during outbound modulation of an RF carrier and compares measured impulse data to reference impulse data. The reference impulse data can be stored at the card reader or obtained from the contactless smartcard in an encrypted form. Optionally, the card reader issues one or more challenges to the contactless smartcard in connection with a card transaction and verifies a response to the one or more challenges using calibration data. The card reader can determine the card's authenticity based on the impulse data, the response to one or more challenges, or a combination thereof.

21 Claims, 10 Drawing Sheets

OTHER PUBLICATIONS

ISO/IEC 14443-2, Committee Draft re. Identification cards—Contactless integrated circuit(s) cards—Proximity cards, Part 2: Radio frequency power and signal interface (Oct. 20, 1998), p. i-8.

ISO/IEC 14443-3, Committee Draft re. Identification cards—Contactless integrated circuit(s) cards—Proximity cards, Part 3: Initialization and anticollision (Oct. 20, 1998), p. i-5.

ISO/IEC 14443-3, 2nd Committee Draft re. Identification cards—Contactless integrated circuit(s) cards—Proximity cards, Part 3: Initialization and anticollision (Feb. 28, 1999), p. i-5.

ISO/IEC 14443-2, Final Committee Draft re. Identification cards—Contactless integrated circuit(s) cards—Proximity cards, Part 2: Radio frequency power and signal interface (Mar. 26, 1999), p. i-8.

International Standard Organization (ISO) Committee draft of ISO/IEC 14443-2 entitled "Identification Cards—Contactless Integrated Circuit(s) Cards—Proximity Cards, Part 2: Radio Frequency Power and Signal Interface," dated Jun. 21, 1998, 14 pages.

PCT Invitation to Pay Additional Fees and Partial Search Report mailed Aug. 10, 2010; International Application No. PCT/US2010/025878, 6 pages.

* cited by examiner

| ID | CSC Protocol | Timing | Amplitude | RF | α | β | γ | Impulse Data |
|---|---|---|---|---|---|---|---|---|
| ABC/783 | 14443/A | +1us / -2us | 10-100% | Reset | Ignore | Ignore | Reset | [1.7, 1.4, 1.2, 1.5, 2.1,...] |
| ABC/134 | 14443/A | +1us / -2us | 15-100% | Ignore | Ignore | Reset | Reset | [1.3, 1.1, 1.9, 1.9, 1.4...] |
| PQR/619 | 14443/B | ±3us | 150 / 100% | Ignore | Reset | Ignore | Reset | [0.8, 0.8, 1.6, 1.9, 0.4,...] |
| ■ ■ ■ | ■ ■ ■ | ■ ■ ■ | ■ ■ ■ | ■ ■ ■ | ■ ■ ■ | ■ ■ ■ | ■ ■ ■ | ■ ■ ■ |

CONTACTLESS SMARTCARD AUTHENTICATION

CROSS-REFERENCE TO RELATED APPLICATION

This application claims the benefit of and is a non-provisional of U.S. provisional patent application Ser. No. 61/157,176, filed Mar. 3, 2009, which is incorporated herein by reference for all purposes.

BACKGROUND

The present application relates generally to communications and, more particularly, to communication with contactless smartcards.

Contactless smartcards are widely used to purchase goods and services. For example, it is now possible to pay for gasoline, groceries, and transit fares simply by waving a contactless smartcard in the vicinity of a card reader. Contactless smartcards provide the cardholder with a quick and convenient way to transfer value.

A contactless smartcard communicates with a card reader using electromagnetic radiation. Card transactions often involve an over-the-air exchange of information such as account numbers and card identifiers. Such over-the-air exchanges may provide an opportunity for fraudulent transactions.

Data encryption can help to reduce the incidence fraud in contactless smartcards transactions. However, encryption algorithms are not effective in every situation and may be susceptible to unforeseen weaknesses. Moreover, there is a large body of unencrypted or weakly encrypted cards now in circulation.

BRIEF SUMMARY

Techniques for authenticating a contactless smartcard in a card processing system are disclosed. A card reader measures an impulse response associated with the contactless smartcard during outbound modulation of an RF carrier and compares measured impulse data to reference impulse data. The reference impulse data can be stored at the card reader or obtained from the contactless smartcard in an encrypted form. Optionally, the card reader issues one or more challenges to the contactless smartcard in connection with a card transaction and verifies a response to the one or more challenges using calibration data. The card reader can determine the card's authenticity based on the impulse data, the response to one or more challenges, or a combination thereof.

In one embodiment, a method of authenticating a contactless smartcard is disclosed. The method includes detecting the presence of a contactless smartcard at a card reader and measuring an impulse response of the card reader. The method includes authenticating the contactless smartcard based on the measured impulse response of the card reader. The method may also include obtaining an identifier of the contactless smartcard and determining an expected impulse response of the card reader based on the identifier. Determining whether the contactless smartcard card is authentic can be based on a result of comparing the expected impulse response with the measured impulse response. If it is determined that the contactless smartcard is authentic, a transaction with the card can be initiated or allowed to continue. If it is determined that the card is not authentic, the transaction can be aborted, an alert can be raised, and/or the card identifier can be added to a hotlist.

In one embodiment, a card reader is disclosed. The card reader includes a transmitter, a receiver, a processor, and memory. The transmitter modulates an RF carrier with a transmit data signal for communicating with a contactless smartcard and the receiver detects receive data corresponding to a modulation of the RF carrier by the contactless smartcard. The memory stores calibration data relating to operating characteristics of the contactless smartcard. The processor can issue one or more challenges by varying the transmit data signal and/or the RF carrier in relation to standards of a communication protocol of the contactless smartcard. The processor can authenticate the contactless smartcard based on the calibration data and receive data associated with the one or more challenges. Optionally, the memory stores a list of cards which are not allowed to conduct transactions and the processor updates the list when the card is not successfully authenticated.

In one embodiment, a contactless smartcard is disclosed. The contactless smartcard includes an antenna, an integrated circuit, and a storage. The antenna detects modulation of an RF carrier at an operating frequency of the contactless smartcard and the integrated circuit communicates with a card reader by modulating the RF carrier according to a contactless smartcard communication (CSC) protocol. The storage holds calibration data relating to operating characteristics of the contactless smartcard. The calibration data is accessible to the integrated circuit and may be stored in an encrypted form. Responsive to commands from the card reader, the integrated circuit modulates the RF carrier to send the calibration data to the card reader. In various embodiments, the calibration data includes at least one of a tolerance of the contactless smartcard to variations in pulse timing, a tolerance of the contactless smartcard to variations in pulse spacing, a tolerance of the contactless smartcard to variations in modulation depth, and a tolerance of the contactless smartcard to variations in the CSC protocol. The calibration data may be obtained by a trusted source when the contactless smartcard is manufactured.

Additional aspects of the invention will become apparent in the course of the following description and with reference to the accompanying drawings.

In the figures, similar components and/or features may have the same reference label. In some cases, components of the same type are identified by following the reference label with a dash and a second label that further distinguishes among the similar components. If only the first reference label is used, the description is applicable to any of the similar components designated by the first reference label.

DETAILED DESCRIPTION OF EMBODIMENTS

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Figure 1:
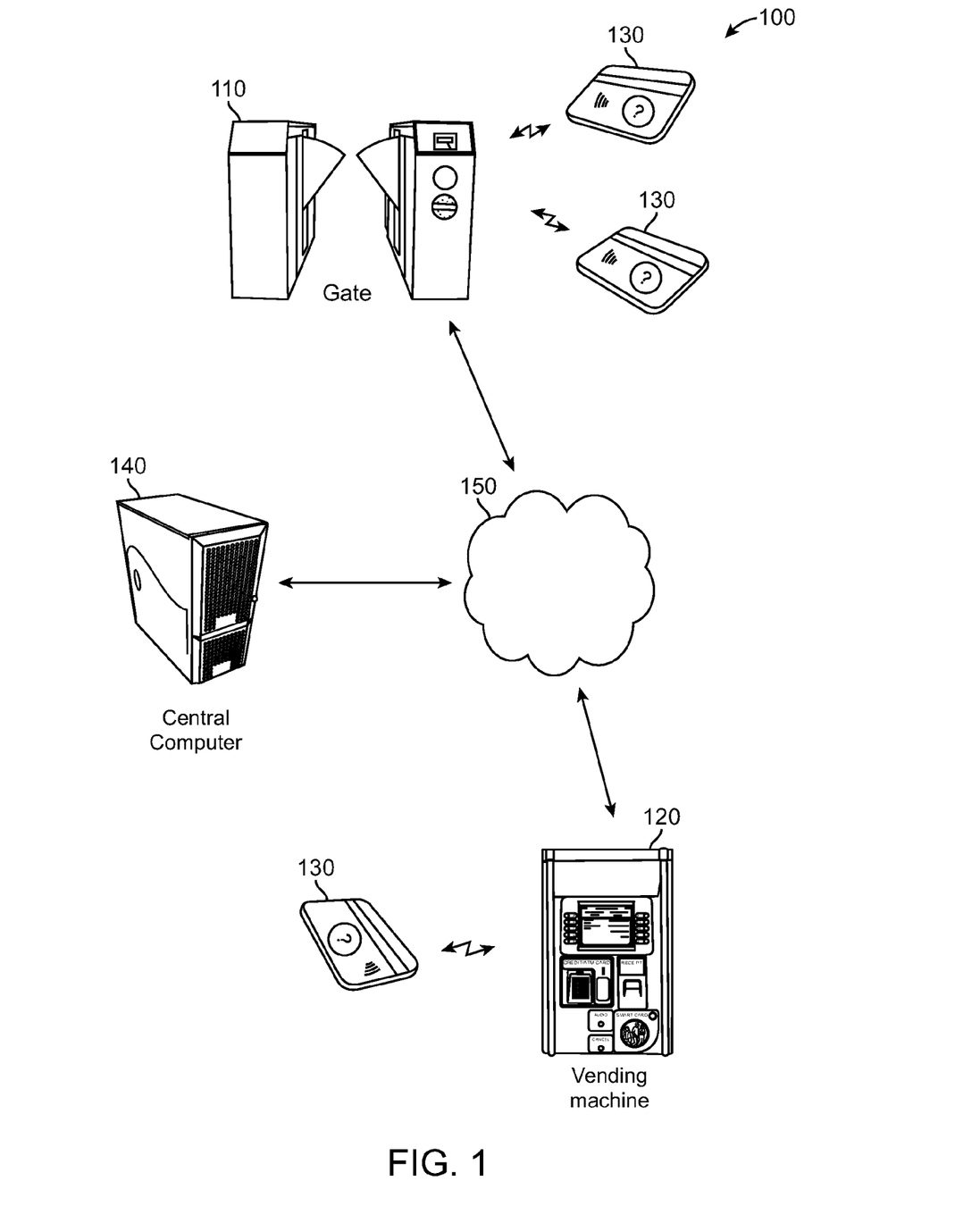
FIG. 1 shows an embodiment of a card processing system.

FIG. 1 shows an embodiment of a card processing system 100. Card processing system 100 can be any system in which data is exchanged between a card reader and a contactless smartcard. As illustrated, card processing system 100 is part of a transportation system and enables passengers to use contactless fare cards to purchase transit services. However, card processing system 100 is not limited to a particular application. In various embodiments, card processing system 100 may be used with POS (point-of-sale) terminals for processing contactless credit cards, card-based access control and security systems, electronic identification systems, and the like.

Card processing system 100 includes card readers 110, 120 and proximity cards 130. Card readers 110, 120 are coupled to a central host computer 140 via a network 150. As shown, card reader 110 is a transit gate and card reader 120 is a vending machine. Proximity cards 130 (also referred to as "cards," or "smartcards") are contactless smartcards which can be used to purchase transit services. For example, gate 110 may automatically deduct a fare when a passenger presents a smartcard 130 upon entering or exiting from a train station. Likewise vending machine 120 may credit excess fares and/or allow a cardholder to purchase additional transit services using information from a contactless smartcard 130.

Card readers 110, 120 communicate with cards 130 using an electromagnetic signal. A radio frequency interface of the card reader generates a carrier signal which conveys commands and data to smartcards 130. Smartcards 130 receive the commands and data and may respond by modulating the carrier signal at a sub-carrier frequency. For example, with ISO 14443 cards, card readers 110, 120 transmit a 13.56 MHz carrier and cards 130 respond by load-modulating the carrier at 847 kHz subcarrier frequencies. In this way, transactions may be performed in which data is read from and written to a card.

Different types of modulation may be used to communicate with different types of ISO 14443 cards as specified in relevant standards. With Type A cards, for example, card readers 110, 120 use a 100% amplitude shift keying (ASK) of the RF carrier and a modified Miller coding scheme for outbound communication. The coding scheme includes pulse position logic which defines how bits are represented to smartcards 130. A non-return to zero (NRZ) coding and a modulation depth of approximately 10% are used to communicate with Type B cards. Card readers 110, 120 issue commands by modulating the RF carrier according to a smartcard communication (CSC) protocol and contactless smartcards 130 respond to valid commands and data by load modulating the carrier at the appropriate subcarrier frequency. Although continuing reference is made to ISO 14443 cards, it will be recognized that the present invention is not limited to a particular type of card or protocol, but applies broadly to communications with contactless smartcards.

Before a contactless smartcard is accepted as a form of payment or identification, it is desirable to determine a card's authenticity. As technology advances, counterfeit or cloned cards may be used to avoid payment, to misappropriate stored value, or even to misrepresent one's identity to a card processing system. A fare card, for example, may be cloned and the cloned card may be offered as the genuine article. The use of cloned cards may result in a significant loss to system operators. Similarly, it may be possible for a card emulator to mimic the operation of a genuine card and to respond in a way that is not detected by conventional card readers.

According to the present embodiment, card readers 110, 120 determine the authenticity of a card 130 in connection with a card transaction. Determining a card's authenticity can be done passively, through an active testing process, or using a combination of both approaches. Using a passive approach, card readers 110, 120 can effectively take an electronic fingerprint of a card and compare it with reference information for an existing card (or batch of cards). Electronic fingerprinting can be performed as part of the card transaction and does not require card modifications.

Active testing, on the other hand, can be based on a stimulus-response mechanism. Card readers 110, 120 can vary the manner in which the RF carrier is modulated and measure a card's response to the change. The card's response can be compared to an expected response corresponding, for example, to a particular type of card from a particular card manufacturer. The expected response can be based on calibration data relating to the card's operating characteristics. The calibration data can be stored either on the card 130, at the card reader 110, 120, or at a central host computer 140.

In some embodiments, card readers 110, 120 generate a series of challenges which a card 130 must pass to establish its authenticity. The tests can be randomly generated to avoid playback attacks. In some embodiments, a card is required to pass a predetermined number of active and/or passive tests before a transaction is allowed to proceed. If the authenticity of a card 130 is deemed suspect, an alert can be generated. For example, card readers 110, 120 may include a flashing light, siren, or other indicator to summon transit personnel for a closer inspection of the card.

When a card 130 cannot be successfully authenticated, it may be added to a hot-list at the card reader 110, 120. Identifiers of hot-listed cards may be communicated to the central host computer 140 over network 150. For example, card reader 110 may report information about a suspicious card to central host computer 140 over a local area network, a wide area network, the internet, etc. Central host computer 140 can compile a list of hot-listed cards and can distribute the list to all card readers in card processing system 100. Central host computer 140 can also track the use (or attempted use) of such cards throughout the transit system. In this way, a cloned or counterfeit card can be rejected throughout card processing system 100, including by card readers which may lack authentication capabilities.

Figure 2:
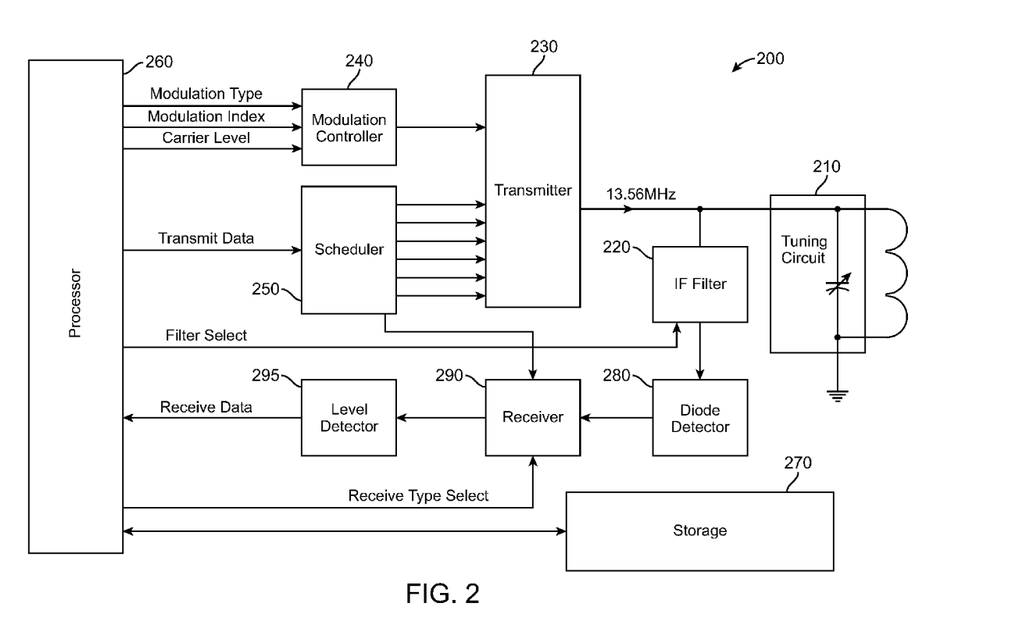
FIG. 2 shows one embodiment of card reader.

FIG. 2 is a block diagram of a card reader 200. Card reader 200 can operate within card processing system 100 as described in connection with card readers 110, 120.

Card reader 200 communicates with contactless smartcards using an antenna 210. Antenna 210 can include a tuning circuit and a coil. The tuning circuit can establish a resonant frequency of antenna 210. For example, antenna 210 can be tuned to 13.56 MHz when used with ISO 14443 cards, or to other frequencies for use with different card types.

Antenna 210 is coupled to a transmitter 230. Transmitter 230 drives antenna 210 to produce the RF carrier and may include an oscillator and related circuitry. As shown, transmitter 230 is also coupled to a modulation controller 240 and a scheduler 250. Modulation controller 240 can output a supply voltage and can determine a level of the RF carrier, a type of modulation, and a modulation level of the transmit data signal. For example, as determined by modulation controller 240, transmitter 230 can modulate the RF carrier with the transmit data using an on-off keying (100% ASK) to communicate with Type A cards. Alternatively, a modulation index of approximately 10% can be used with Type B cards.

An IF filter 220 is disposed between antenna 210 and transmitter 230. Filter 220 can include a bandpass filter which operates at different frequencies as determined by a filter select signal. In the embodiment shown, operating points may include the 13.56 MHz carrier frequency and a 14.41 MHz sideband. Of course, different frequencies can be used with different types of cards. The intermediate frequency output of filter 220 can be rectified by a diode detector 280 and delivered to a receiver 290. Receiver 290 can demodulate the rectified IF signal to produce a receive data signal. A select input to receiver 290 can specify a type of modulation used with the receive signal. For example, amplitude modulation from Type A cards or phase modulation from Type B cards. A level detector 295 coupled to receiver 290 can automatically adjust the receive data signal for use by processor 260.

Processor 260 can control the overall operation of card reader 200. Processor 260 can include one or more microprocessors, microcontrollers, field-programmable gate arrays, complex programmable logic devices, application-specific integrated circuits, or like hardware elements. Processor 260 can be configured to execute fixed or programmable instructions to communicate with contactless smartcards according to one or more CSC protocols, to determine the authenticity of cards, to communicate with a central host computer, and to perform other functions of card reader 200.

One or more storage elements 270 may be coupled to processor 260. Storage elements 270 can include random access memory (RAM), read-only memory (ROM), flash memory, hard disk drives, optical drives, and other computer-readable storage media encoded with data and program instructions that are accessible to processor 260. In one embodiment, processor 260 executes instructions of a computer program product tangibly embodied on a computer-readable storage medium for carrying out some or all of the operations as described herein.

Processor 260 determines a type of modulation and a modulation index to be applied to the transmit data by modulation controller 240. By adjusting the modulation index and the type of modulation, processor 260 can implement different CSC protocols for conducting card transactions. Using modulation controller 240, processor 260 controls the timing of outbound signals and can modulate the RF carrier in any desired manner. For example, with the carrier level signal, a slow modulation with a noise signal can be applied to the 13.56 MHz carrier to test a card's operating characteristics.

Outbound data is sent to transmitter 230 on a transmit path that includes scheduler 250. Scheduler 250 receives transmit data from processor 260 and schedules it for transmission. Scheduler 250 is also coupled to receiver 290 and can provide a timing reference for demodulating inbound card data. The timing reference may also be used in measuring the receiver's impulse response when a card 130 is detected in the RF field.

Figure 3:
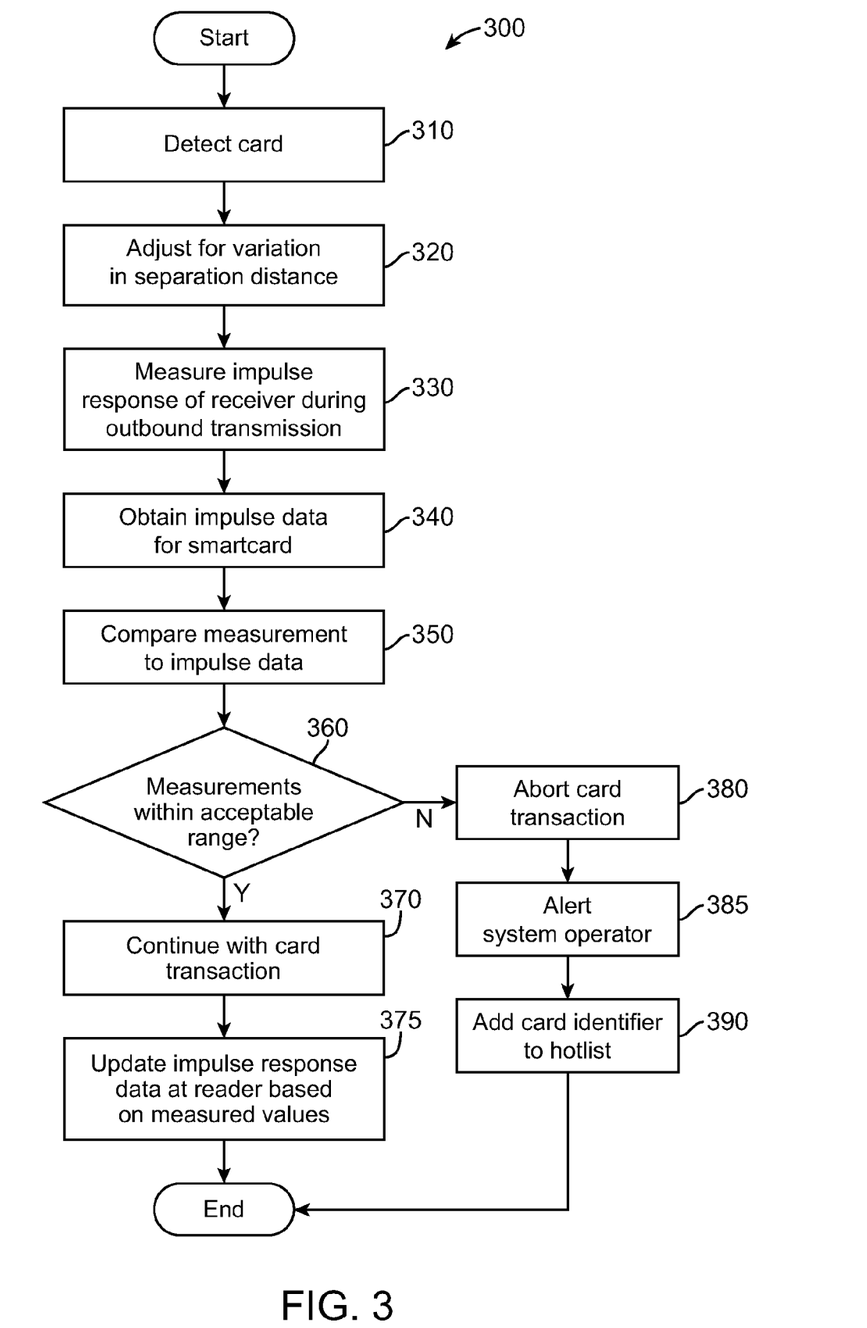
FIG. 3 shows an embodiment of a process for authenticating a contactless smartcard.

FIG. 3 shows an embodiment of a process 300 for authenticating a contactless smartcard based on an impulse response characteristic. Authentication process 300 can be performed by card reader 200 operating as part of a card processing system 100 as these elements are described herein.

At block 310, a card 130 is detected at card reader 200. This may occur when receiver 290 detects a change in the signal from IF filter 220 which results from the card's coupling with the RF carrier. Receiver 290 can signal to processor 260 that a card has been detected. At block 320, a level of the receive data signal can be adjusted to account for variation in the distance between the contactless smartcard 130 and the card reader antenna 210. For example, the level can be reduced when the card is placed directly on the antenna or it may be increased when the card is presented at an outer bound of the card reader's operating range. At block 330, processor 260 measures an impulse response of receiver 290 due to the card's presence in the magnetic field.

Alternatively or additionally, the card 130 may be detected based on its response to commands from card reader 200. For example, card reader 200 may issue a wake-up or similar command to which the card 130 responds by load modulating the RF carrier. Processor 260 can detect the response in the receive data and determine an appropriate CSC protocol for communicating with the card as well as a timing at which the impulse response characteristic is measured. Based on the receive data, processor 260 may set modulation controller 240 to the appropriate modulation index, modulation type, and carrier level for communicating with the smartcard according to the CSC protocol.

Figure 4A:
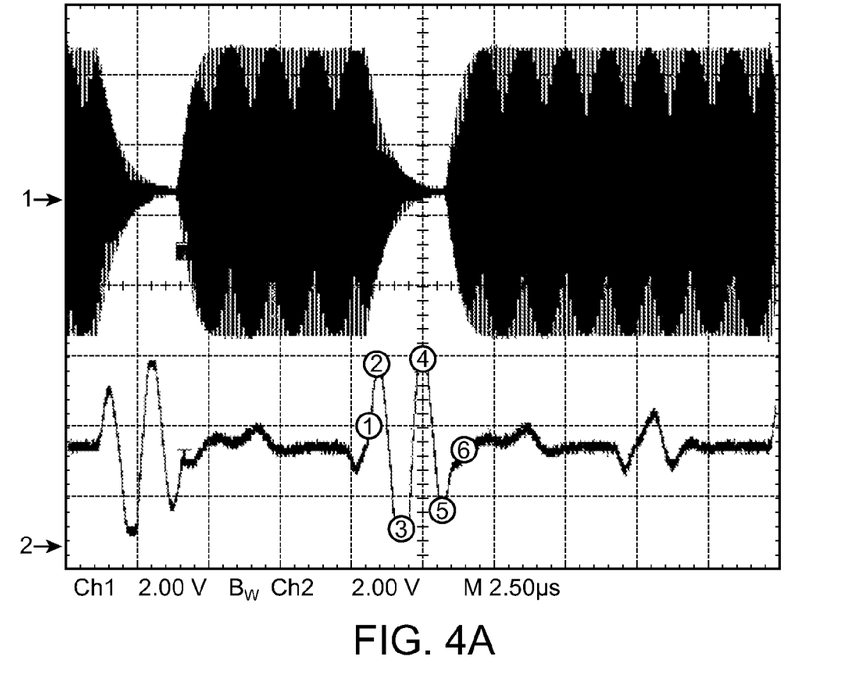
FIGS. 4A-4C depict an exemplary impulse response characteristic of a card reader.
Figure 4B:
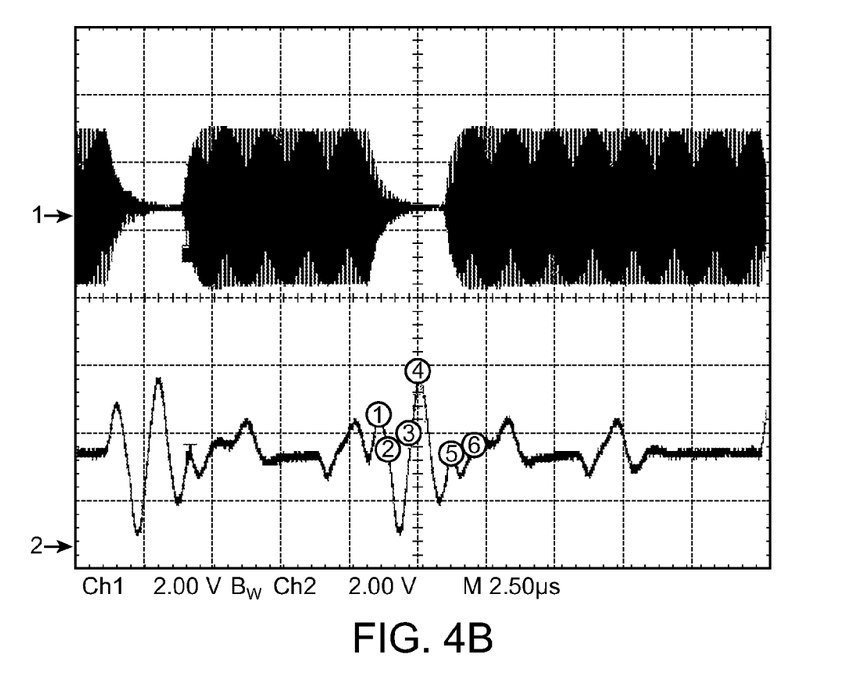
Figure 4C:
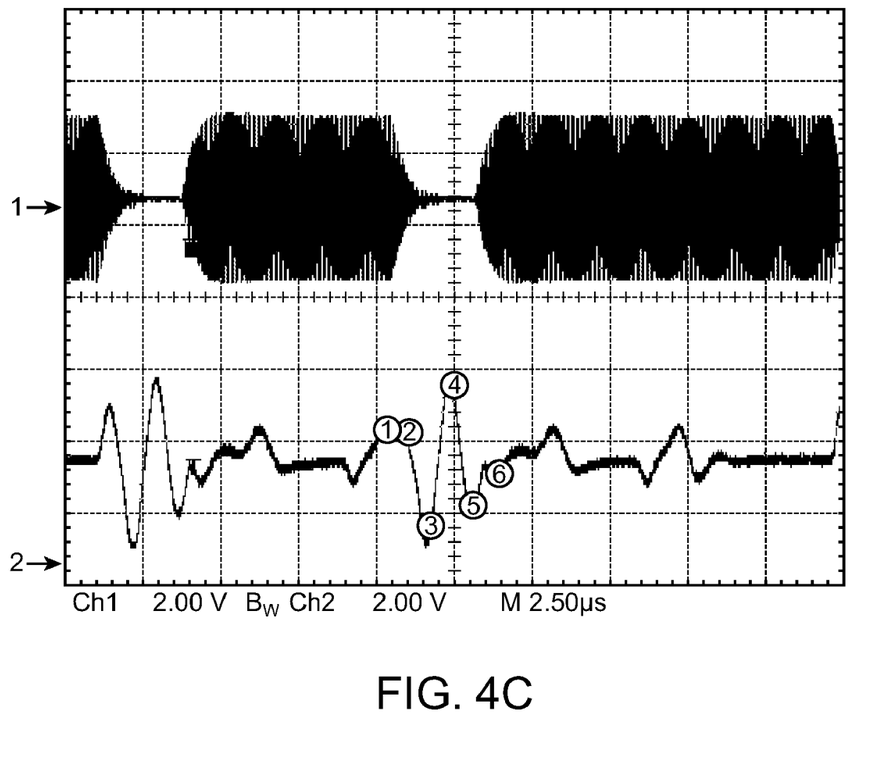

FIGS. 4A-4C illustrate the impulse response of an exemplary card reader. FIG. 4A shows operation of the card reader before a contactless smartcard is detected. The top trace represents a 13.56 MHz carrier such as can be used to communicate with ISO 14443 cards. The bottom trace represents the receive data signal after filtering and demodulation. The receiver's impulse response is illustrated at six reference points (labeled ①-⑥) as the field is switched off and then switched back on.

FIG. 4B shows the same signals when a contactless smartcard 130 manufactured by a first company ("ABC") is inserted into the field at a distance of approximately ¾" from the card reader antenna. As can be seen, the impulse response is affected by the presence of card ABC and the measured values at each of the six reference points differ from what is observed in FIG. 4A. Changes in the card reader's impulse response characteristic are a function of the ABC card's resonant frequency, power consumption, and electronics and thus may differ measurably for different types of cards, different card manufacturers, and even different runs of a same card.

FIG. 4C shows the same signals as FIGS. 4A-4B when a contactless smartcard 130 manufactured by a second company ("DEF") is inserted into the field. As with FIG. 4B, card DEF is positioned approximately ¾" from the card reader antenna and again the measured values at each of the six reference points differ from what is observed in FIGS. 4A-4B. Thus, the impulse response characteristic can be used as a contactless smartcard's "fingerprint" and provides information with which to authenticate the card in a card processing system.

At block 340, processor 260 obtains impulse data for the card. The impulse data can be stored at card reader 200 or it can be requested from the contactless smartcard 130 and serves as a reference against which the measured impulse response can be compared. Preferably, the impulse response data is recorded and associated with card identifiers in connection with the manufacturing process, such as when a new batch of cards is produced. For example, impulse data may be collected for each type of card that is accepted at card reader 200 and stored in a lookup table or database of storage 270. Alternatively, card reader 200 may request impulse data from the smartcard 130 at any point during the card transaction.

At block 350, processor 260 compares the measured impulse response with the reference impulse data. As one example, the receive data signal can be sampled as discussed in connection with FIGS. 4A-4C and each sample can be compared with corresponding reference data. If a sampled value is within a predetermined threshold of the corresponding reference data, it may be regarded as a match. Otherwise, it may be judged as no match. At block 360, the authenticity of the card can be determined based on a number of matching points or other measure of correlation between measured and reference impulse data.

If the card is successfully authenticated based on the impulse response measurements, block 370, the transaction is allowed to continue. Optionally, at block 375, updated impulse response data for the successfully authenticated card can be recorded. For example, a card's impulse response may change slightly over time due to wear, component aging, etc. If desired, processor 260 can update card-specific impulse response data in storage 270 to reflect such changes. If wear tracking is desired, block 340 may be modified to reflect that card reader 200 searches first for card-specific impulse data and, if none is found, obtains reference impulse data. Note that authentication based on impulse response can be performed at any time prior to completion of a card transaction.

If a card is not successfully authenticated, block 380, the card transaction can be aborted. At block 385, the system operator may be notified of the failed authentication. For example, gate 110 may use a flashing light or audible alert to signal that further verification of the card is required, or that operator assistance is needed to complete a transaction. Optionally, at block 390, the card can be added to a hot-list and/or communicated to central host computer 140 so that its further use in the card processing system 100 can be prevented.

Figure 5:
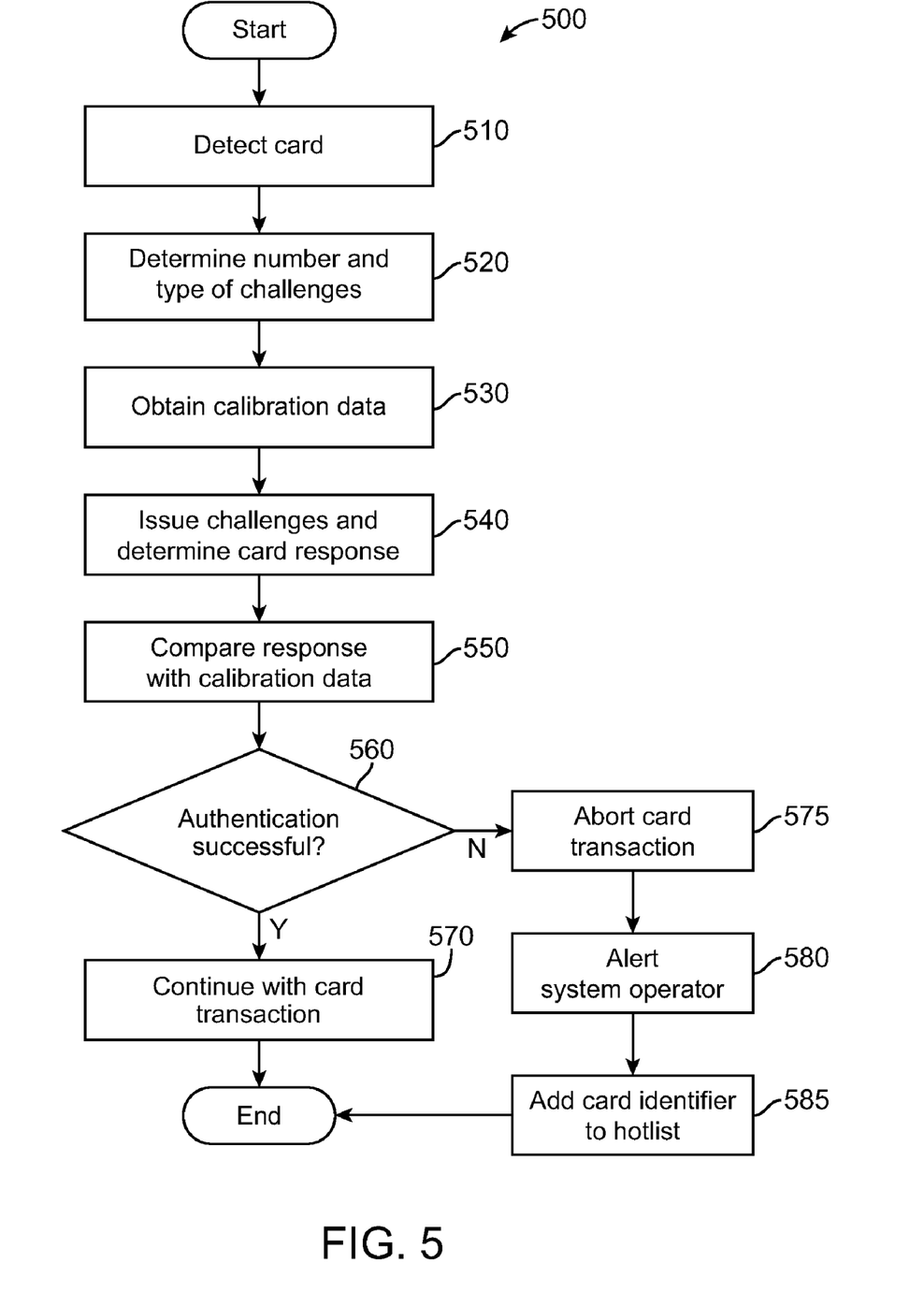
FIG. 5 shows a further embodiment of a process for authenticating a contactless smartcard.

FIG. 5 shows an embodiment of a process 500 for authenticating a contactless smartcard based on challenge-response testing. Authentication process 500 can be performed by card reader 200 operating as part of a card processing system 100 as these elements are described herein.

At block 510, a contactless smartcard 130 is detected at the card reader 200. This may occur when the card begins load modulating the RF carrier in response to a wake-up command from the card reader or at some other time. Processor 260 determines the appropriate CSC protocol for communicating with the card. For example, based on the receive data, processor 260 may set modulation controller 240 to the appropriate modulation index, modulation type, and carrier level for communicating with the smartcard.

At block 520, processor 260 determines a number and type of challenges with which to authenticate the card. Challenges may represent controlled variations in the communication between card reader 200 and a contactless smartcard 130. This can include varying the timing or duration of pulses in the outbound communication relative to standards of a CSC protocol. For example, processor 260 can adjust the pulse position or bit representation sequence by a predetermined amount. Processor 260 can also increase or decrease the modulation index of outbound communications relative to CSC protocol standards, inject spurious pulses into the communication, add noise to the RF carrier, and/or otherwise alter the outbound modulation in a controlled fashion. The number and type of challenges can be determined randomly, or they may be selected based on the card identifier.

When the number and type of challenges are determined, block 530, the card reader obtains calibration data for the contactless smartcard. The calibration data can serve as a reference to which card responses are compared. For each of the challenges, calibration data may provide an indication of the expected response. As with impulse response information, calibration data can be stored at the card reader 200 or at the contactless smartcard 130 and may be specific to an individual card or applicable to a batch of cards.

Figure 6:
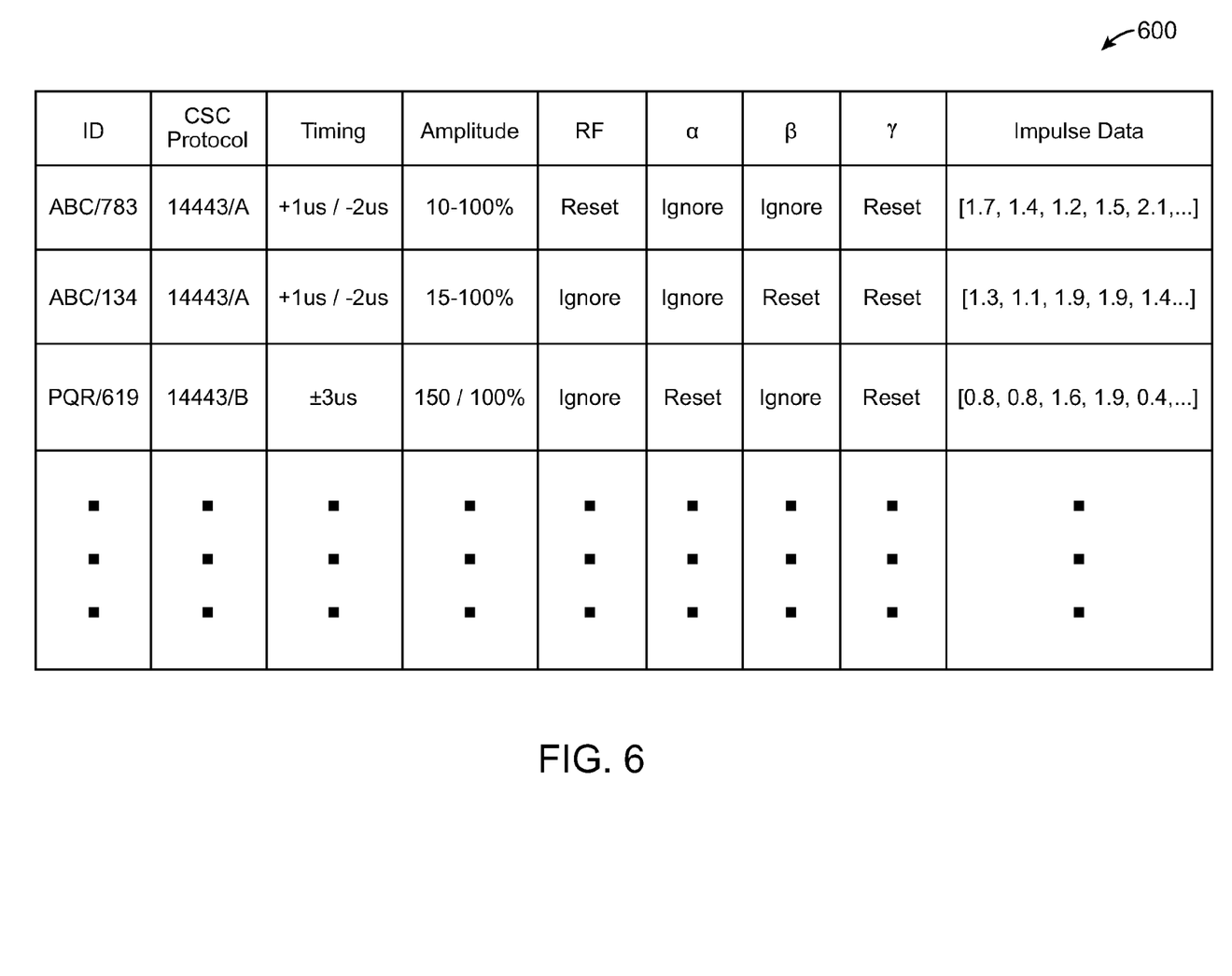
FIG. 6 shows exemplary calibration data.

FIG. 6 shows exemplary calibration data 600 such as can be used for authenticating a contactless smartcard. An ID field includes one or more card identifiers. The one or more card identifiers can be world-unique serial numbers for individual cards or manufacturer/batch information for groups of cards, or other card identification data. For example, the identifier "ABC/783" may correspond to information written to the card during the manufacturing process which is communicated to the reader as part of a card transaction. The CSC Protocol field provides information about standards for communicating with the card such as whether it is an ISO 14443 or some other type of card.

Any number of additional fields representing operating characteristics of the contactless smartcard can be included in calibration data 600. As illustrated, a Timing field indicates a range over which the card will operate relative to requirements of the CSC protocol. For example, timing may represent the amount by which a pulse or pause interval can be shifted within a bit period without disrupting card operation. Put another way, timing information may indicate the extent to which the card will tolerate variation in position and/or duration of a pulse relative to requirements of its CSC protocol.

An Amplitude field indicates the card's ability to operate when the modulation index varies from strict protocol standards. The calibration data for card ABC/783, for example, indicates that it will tolerate amplitude modulation in the range of 10-100% of protocol standards. Thus, card reader 200 would expect that communication with a genuine ABC/783 card would not be disrupted by a 45% modulation index, and likewise that the genuine card would not operate at 8% modulation. The RF column of calibration data 600 can represent the card's ability to tolerate changes in the RF carrier such as short pauses during idle mode or a slow modulation of the field. Although many variations are possible, the RF column may indicate whether a card will ignore an extraneous modulation of the RF carrier, or whether such modulation will reset the card's operation. For example, the card may be tested by modulating the RF carrier with a 1 kHz-10 kHz signal and comparing its response with information from calibration data 600.

In addition to information about timing, amplitude, and noise rejection, calibration data 600 can indicate how the card will respond to peculiarities of the CSC protocol. These peculiarities may be documented or undocumented features and may vary from card-to-card depending upon details of how the protocol is implemented by a particular manufacturer. In some cases, errors may be deliberately introduced to measure a card's response. For example, card reader 200 can test the CSC protocol by returning incorrect checksums to a card or by attempting to read or write data using known bad addresses.

Exemplary calibration data 600 includes entries for a card's response to three predetermined protocol challenges ($\alpha$, $\beta$, $\gamma$). The predetermined challenges can vary based on the CSC protocol to be tested, the card manufacturer, the type of card, etc. In some embodiments, calibration data includes an indication of whether the challenge is expected to halt or reset card operation. For example, exemplary calibration data 600 indicates that card ABC/783 will ignore test sequence $\alpha$, but will be reset by test sequence $\gamma$. Calibration data may also include reference Impulse Data which, in the example, is shown as including discrete values of the receive signal.

Figure 7:
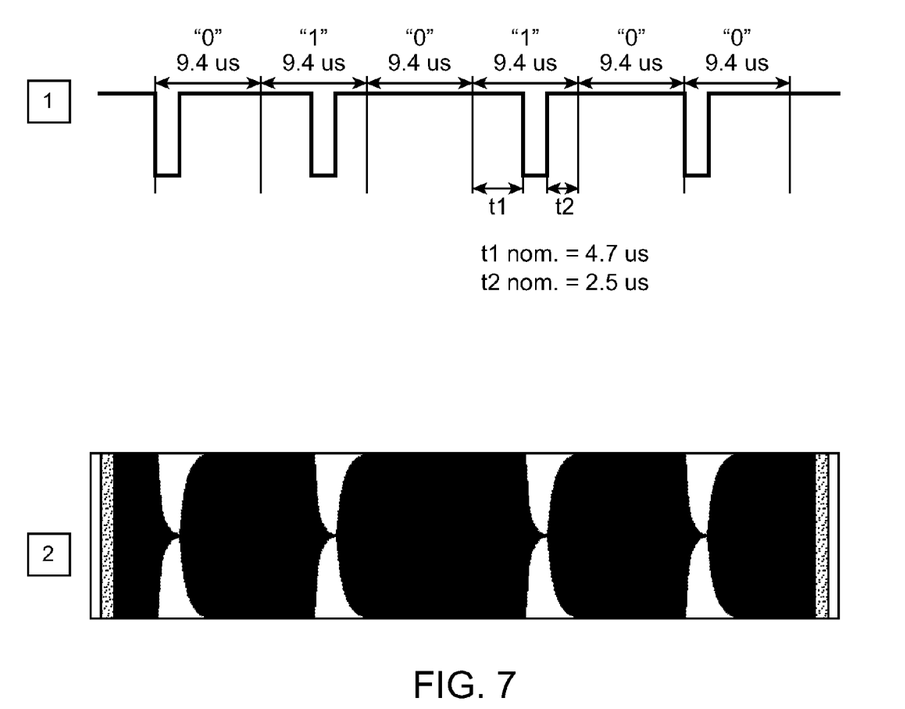
FIG. 7 shows an exemplary timing challenge such as can be used with an ISO 14443/A smartcard.

At block 540, when calibration data has been obtained, card reader 200 proceeds to implement the selected challenges and determine the card's response. FIG. 7 shows an exemplary timing challenge for a Type A smartcard. In upper portion [1], a bit representation of the transmit data sequence 010100 is shown for which, according to ISO 14443/A standards, each interval has a duration of 9.4 us. For purposes of illustration, an X sequence (with subintervals $t_1$, $t_2$) is shown in the fourth bit position. According to protocol standards, subinterval $t_1$ is defined as ½ of the bit duration (4.7 us) which must be followed by a pause $t_2$ (nominally 2.5 us). The RF carrier [2] is shown below the transmit data in the lower portion of the figure.

Processor 260 can issue a timing challenge by varying $t_1$ or $t_2$ in one or more bit intervals for which a sequence X is required by the CSC protocol. As one example, scheduler 250 may implement the timing challenge by increasing $t_1$ by 2 us in one bit interval and/or decreasing $t_1$ by 1 us in subsequent bit interval. In another challenge, $t_1$ and $t_2$ could be adjusted to extend the bit pulse for hundreds of micro-seconds, or for any desired duration. Note that varying one subinterval $t_1$, $t_2$ implies a corresponding change in the other subinterval in a given bit interval. Processor 260 can record a response to each timing challenge.

Figure 8:
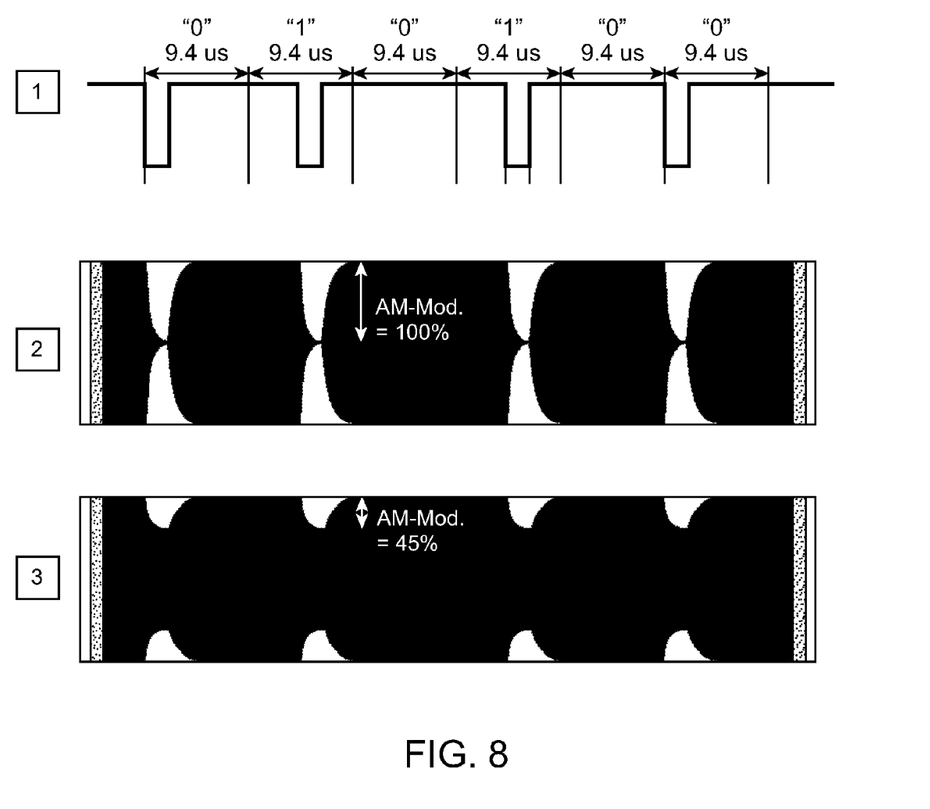
FIG. 8 shows an exemplary amplitude challenge such as can be used with an ISO 14443/A smartcard.

FIG. 8 shows an exemplary amplitude challenge for a Type A smartcard. As with FIG. 7, a bit representation of the transmit data sequence 010100 is shown in the upper portion [1] and the corresponding 9.4 us bit intervals are labeled. For reference, the second item [2] shows an amplitude modulation of the bit sequence at approximately 100% of the RF carrier according to protocol standards. The third item [3] shows an amplitude challenge in which the modulation index is set to 45%. Processor 260 can test multiple amplitude variations by adjusting the modulation index and can record a card's response to each amplitude variation for use in authenticating the card.

At block 550, for each challenge issued, processor 260 compares the actual card response with an expected card response determined based on the calibration data. When a number of challenges are issued, processor 260 may generate a score for each challenge and an overall score for the card. For example, processor 260 may award one point if 5 timing challenges are issued and the card responds to 3 in the expected manner, and 0 points if the card passes fewer than 3 challenges. Points may also be earned when the card behaves as expected in the presence of noise or when it responds as expected to CSC protocol errors or undocumented features. Processor 260 can regard each challenge as being worth the same number of points or the various challenges may be weighted differently.

At block 560, card reader 200 determines whether the card has been successfully authenticated. Successful authentication may be based upon the number of points earned, the number of challenges passed, the impulse response correlation, or any combination of factors. If the card is successfully authenticated, block 570, the card transaction can proceed. Otherwise, card reader 200 may abort the transaction, block 575, alter the system operator, block 580, and optionally hot-list the card, block 590 as previously described.

Figure 9:
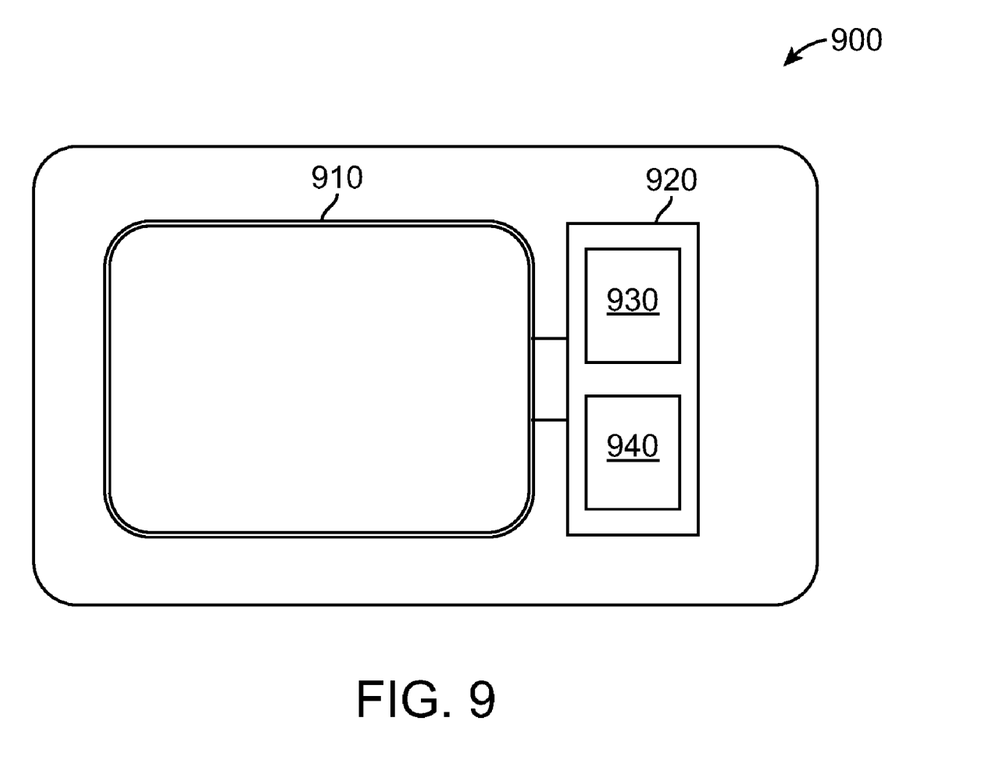
FIG. 9 shows one embodiment of a contactless smartcard.

FIG. 9 shows one embodiment of a contactless smartcard 900. As shown, contactless smartcard 900 includes an antenna 910 and an integrated circuit 920. Antenna 910 and integrated circuit 920 can be attached to a rigid substrate and, in a preferred embodiment, are sized according to ISO 7816 standards for identification cards.

Integrated circuit 920 can be powered by energy from an RF carrier and includes a CSC protocol module 930 and storage 940. CSC protocol module 930 controls the manner in which the card 900 load modulates the RF carrier to communicate with a card reader. In some embodiments, CSC protocol module 930 implements a superset of the CSC protocol which may include undocumented features and/or operating characteristics which vary from strict protocol standards.

Storage 940 includes information used to conduct card transactions. This may include conventional card identifiers such as a world-unique serial number and manufacturing data. Storage 940 may also include calibration data relating to card operating characteristics. The calibration data can be as described in connection with FIG. 6 and may include impulse response data as well as operating parameters and tolerances. Preferably, calibration data is determined by a trusted authority such as the card issuer and maintained in storage 940 in encrypted form.

When requested by a card reader, integrated circuit 920 sends the calibration data in its encrypted form by load modulating the RF carrier. Storage 940 may be divided into a plurality of blocks, and calibration data may be accessed by reading one or more blocks at predetermined addresses. Alternatively, calibration data may be accessed in response to a proprietary command set. In some embodiments, calibration data is stored in a read-only portion of storage 940. In other embodiments, integrated circuit 920 permits write access to calibration data and is capable of storing updated information (such as updated impulse response measurements) when requested by the card reader.

As will be understood by those skilled in the art, the present invention may be embodied in other specific forms. Those skilled in the art will recognize, or be able to ascertain using no more than routine experimentation, many equivalents to the specific embodiments of the invention described herein. Such equivalents are intended to be encompassed by the following claims.

What is claimed is:

1. A method of contactless smartcard authentication, comprising:
   detecting the presence of a contactless smartcard at a card reader;
   measuring an impulse response of the card reader to the presence of the contactless smartcard; and
   obtaining calibration data for the contactless smartcard, wherein the calibration data comprises at least one of a tolerance of the contactless smartcard to variations in pulse timing, a tolerance of the contactless smartcard to variations in pulse spacing, a tolerance of the contactless smartcard to variations in modulation depth, or a tolerance of the contactless smartcard to variations in the CSC protocol;
   determining at least one challenge for the contactless smartcard based on the calibration data;
   detecting a response of the contactless smartcard to the at least one challenge; and
   authenticating the contactless smartcard based on the measured impulse response of the card reader;
   wherein the contactless smartcard is authenticated based on a result of comparing the impulse responses and the response to the at least one challenge.

2. The method of claim 1, wherein the calibration data comprises at least one of a timing variation, an amplitude variation, and a protocol variation relative to a communication protocol of the contactless smartcard.

3. The method of claim 1, further comprising:
   comparing an expected response based on the calibration data with the response of the contactless smartcard to the at least one challenge.

4. A card reader, comprising:
   a transmitter configured to modulate an RF carrier with a transmit data signal for communicating with a contactless smartcard;

a receiver configured to detect receive data corresponding to a modulation of the RF carrier by the contactless smartcard;

a processor configured to vary the transmit data signal in relation to standards of a communication protocol of the contactless smartcard in one or more challenges; and a memory configured to store calibration data relating to operating characteristics of the contactless smartcard, wherein the calibration data comprises at least one of a tolerance of the contactless smartcard to variations in pulse timing, a tolerance of the contactless smartcard to variations in pulse spacing, a tolerance of the contactless smartcard to variations in modulation depth, or a tolerance of the contactless smartcard to variations in the CSC protocol, wherein the processor is configured to authenticate the contactless smartcard based on the calibration data and receive data associated with the one or more challenges.

5. The card reader of claim 4, wherein the one or more challenges comprise at least one of varying a pulse timing of the transmit data signal in relation to the standards of the communication protocol of the contactless smartcard, varying a pulse spacing of the transmit data signal in relation to the standards of the communication protocol of the contactless smartcard, and varying a modulation depth of the transmit data signal in relation to the standards of the communication protocol of the contactless smartcard.

6. The card reader of claim 4, wherein the processor is configured to add a noise signal to modulation of the RF carrier in connection with the one or more challenges.

7. The card reader of claim 4, wherein the processor is configured to obtain the calibration data from the contactless smartcard.

8. The card reader of claim 4, wherein the processor is configured to detect an identifier of the contactless smartcard in the receive data and to obtain the calibration data from a non-volatile storage of the card reader based on the identifier.

9. The card reader of claim 8, wherein the memory is configured to store a hot-list and the processor updates the hot-list with the identifier of the contactless smartcard when the contactless smartcard is not successfully authenticated.

10. The card reader of claim 4, wherein the processor is configured to determine an impulse response of the card reader to the contactless smartcard.

11. The card reader of claim 10, wherein the memory is configured to store an expected impulse response for the contactless smartcard and the processor is configured to compare the impulse response of the card reader to the expected impulse response in connection with authenticating the contactless smartcard.

12. The card reader of claim 4, wherein the processor is configured to generate an alert when the contactless smartcard is not successfully authenticated.

13. The card reader of claim 4, wherein the processor is configured to abort a transaction with the contactless smartcard when the contactless smartcard is not successfully authenticated.

14. The card reader of claim 4, wherein the processor is configured to select the one or more challenges in a random fashion.

15. The card reader of claim 4, wherein the calibration data corresponds to a group of contactless smartcards having similar operating characteristics.

16. The card reader of claim 4, wherein the calibration data comprises a plurality of entries each with calibration data for a different contactless smartcard.

17. A method of contactless smartcard authentication, comprising:

detecting a contactless smartcard at a card reader;
obtaining an identifier of the contactless smartcard;
determining one or more challenges for the contactless smartcard based on the identifier;
varying a transmit signal in relation to standards of a communication protocol of the contactless smartcard to issue the one or more challenges;
determining at the card reader a response of the contactless smartcard to the one or more challenges; and
authenticating the contactless smartcard at the card reader based on the response to the one or more challenges.

18. A contactless smartcard, comprising:

an antenna configured to detect modulation of an RF carrier at an operating frequency of the contactless smartcard;
an integrated circuit configured to modulate the RF carrier according to a contactless smartcard communication (CSC) protocol; and
a storage accessible to the integrated circuit and configured to hold calibration data relating to operating characteristics of the contactless smartcard, wherein the calibration data comprises at least one of a tolerance of the contactless smartcard to variations in pulse timing, a tolerance of the contactless smartcard to variations in pulse spacing, a tolerance of the contactless smartcard to variations in modulation depth, or a tolerance of the contactless smartcard to variations in the CSC protocol,
wherein the integrated circuit is configured to send the calibration data by modulating the RF carrier in response to a card reader command.

19. The contactless smartcard of claim 18, wherein the calibration data is obtained when the contactless smartcard is manufactured.

20. The contactless smartcard of claim 18, wherein the storage comprises impulse response data corresponding to a measured effect of the smartcard on a receiver of a card reader.

21. The contactless smartcard of claim 18, wherein the calibration data comprises a tolerance of the smartcard to noise in the RF carrier.

* * * * *